United States Patent [19]

Kauzal

[11] 4,075,325

[45] Feb. 21, 1978

[54] VETERINARY LICK PREPARATION

[76] Inventor: Gabriel Peter Kauzal, P.O. Box 1 Potts Point, Sydney, Australia, 2011

[21] Appl. No.: 735,046

[22] Filed: Oct. 22, 1976

[51] Int. Cl.² .................... A61K 33/34; A61K 47/00; A23K 1/02

[52] U.S. Cl. .................................. 424/140; 424/147; 424/184; 424/203; 424/247; 424/258; 424/270; 424/329; 424/347; 424/361; 426/648

[58] Field of Search ............... 424/361, 140, 147, 184, 424/203, 247, 258, 270, 329, 347; 426/648

[56] References Cited

U.S. PATENT DOCUMENTS

| | | | |
|---|---|---|---|
| 2,124,950 | 7/1938 | Knapheide et al. | 426/648 |
| 3,198,635 | 8/1965 | Anderson | 426/648 |
| 3,288,676 | 11/1966 | Kauzal | 424/361 |
| 3,476,565 | 11/1969 | Anderson et al. | 424/648 |

Primary Examiner—Sam Rosen
Attorney, Agent, or Firm—Emory L. Groff, Jr.

[57] ABSTRACT

A veterinary lick preparation containing up to about 75% molasses by weight is prepared by compounding the molasses with a solidifying agent being paraffin wax, hydrogenated animal fat or hydrogenated vegetable oil, at a temperature of up to 180° F and a pressure of at least 100 Kilo Pascalls. The resultant lick is not hygroscopic under field conditions and thus resists climatic deterioration.

10 Claims, No Drawings

VETERINARY LICK PREPARATION

This invention has been devised to provide a nutritional preparation for animals (including a carrier which is palatable to animals) and a method of making such preparation. More particularly, but without limitation thereto, the invention provides a simple means by which a medicament, selected in accordance with the condition to be treated or guarded against, may be administered in a palatable lick form.

While prior art veterinary lick preparations based on molasses have been quite suitable for the purpose for which they were devised, they have invariably been found under field conditions to be hygroscopic— which property results in a rapid deterioration of the preparations under unfavourable climatic conditions.

It is the object of this invention to provide a veterinary preparation which is free of the above disadvantages. Such a preparation may include one or more medicaments such as substance (s) for eradicating internal parasites (e.g. anthelmintic substances) and/or external parasites (e.g. tick or lice repellents) or bloat inhibiting ingredient (s), as will be explained hereafter. It is also an object of this invention to provide a medicament-free nutritional preparation for animals.

Broadly, the invention comprises a composite of molasses with at least one solidifying agent as hereafter defined, the components being compounded together with heat. The ingredients are treated at a temperature not exceeding 180° F, and preferably under a pressure in excess of atmospheric, although pressures less than atmospheric may also be employed.

Thus, this invention provides a process for the production of a lick preparation for animals wherein molasses is compounded with at least one solidifying agent as hereafter defined, at a temperature not exceeding 180° F and under an absolute pressure in excess of 0 kilo Pascalls. Preferably the pressure used is 100 kilo Pascalls or more.

As used herein, the term "molasses" shall be deemed to include residual sugar syrups or the residual product resulting from the manufacture of starches or gluten from cereals.

The solidifying agent comprises paraffin wax (preferably paraffin wax which is refined (micro crystalline) or semi refined having a melting point in the range 135°–180° F), hydrogenated animal fat (e.g. tallow) or hydrogenated vegetable oil, or a mixture of any of the foregoing. In addition to the above ingredients, the preparation may include nitrogenous products which raise the feed value of the preparation, such as biuret and/or urea or phosphoric acid. The preparation also preferably includes fillers, examples being calcium phosphate, pollard and other cereals, sunflower meal, soya meal, peanut meal, sodium chloride (common salt), magnesium oxide, calcium carbonate and other trace elements such as cobalt, copper, manganese etc.

Preferred ranges of proportions (by weight) of the above ingredients are: molasses 25–75%, paraffin wax 1–20%, paraffin wax augmented by hydrogenated (hardened) animal fat or vegetable oil 1–10%, urea 1–45%, calcium phosphate 1–10%, pollard and/or other cereals 1–35%, calcium carbonate 1–15% magnesium oxide 1–15%, sodium chloride (common salt) 1–20%, phosphoric acid 1–15%, other trace elements such as cobalt, copper, magnesium 0.1–20%.

As an example, an efficaceous preparation would include: molasses 65%, paraffin wax 3%, urea 5%, calcium phosphate 1%, pollard or other cereals 10%, magnesium oxide 5%, calcium carbonate 5%, sodium chloride 5% with the remaining 1% constituted by trace elements such as cobalt 0.3%, copper, manganese, etc.

The above ingredients can, if desired, be augmented by the addition thereto of one or more medicaments. Examples of such medicaments are:

(i) phenothiazine, thiobendazol and O,O-diethyl-O-(3-chloro-4-methyl-7-coumarinyl) phosphorotioate, which can function to eradicate internal parasites such as worms in the intestines of animals and external parasites such as ticks and lice — and hexachlorophane, which functions to combat fluke. Compounds for eradicating worms are known as anthelmintics — or anthelmintic substances.

(ii) benzalkonium chloride, ethoxyquinoline and methyl polysiloxane which, together or individually, are effective to inhibit bloat. Other useful bloat inhibitors — both individually and in association with one another and/or those just mentioned — include alcohol ethoxylates (which are exemplified by teric ethoxylate, and which include straight chain alcohols from a synthetic source with 2–23 molecules of ethylene oxide), anti-foaming inhibitors (as exemplified by a 100% polydimethyl siloxane compound which incorporates a silica filler), appropriate glycols (exemplified by the ethoxylated polypropylene glycol known commercially as Pluronics), and metallic salts (as exemplified by iron and/or copper sulphates). While one or more antiparasite substances or bloat inhibitors can be employed, it is sometimes preferred that they should not both be present in a particular preparation. The proportions by weight of the above medicaments to the finished product are conveniently 0.5–10% in the case of the antiparasite substance (s) and 0.01 to 10% for the more potent bloat inhibitor (s).

As stated, the temperature employed in the process of the invention is 180° F or less and preferably lies between 140° and 180° F. The pressure used can be any pressure from 0 kilo Pascalls; in the process of the invention the preferred pressure is 100 kilo Pascalls or more.

If desired, one or more catalysts may be added to the ingredients in the preparation of the veterinary lick. A preferred catalyst is one which accelerates the rate of solidification of the lick. Any suitable catalyst may be employed for this purpose; especially good results have been obtained when a product of the baking industry has been used as catalyst — for example, stale bread or stale biscuit crumbs. Such a catalyst may be added to the ingredients in the proportion of 1–40% by weight of the finished product.

Guar gum may also be used as catalyst, preferably in the proportion of 0.5–5.0% by weight. If desired two or more catalysts can be used: for example, a combination of guar gum and one or more products of the baking industry.

If it is found that addition of a catalyst causes the mixture to harden prematurely, extra molasses may be added to maintain a pourable consistency of the mixture.

The following examples indicate how veterinary preparations in accordance with the invention may be made:

EXAMPLE 1

To make a lick incorporating a substance for controlling worms, ticks and lice, 1½ tons of molasses is placed in an appropriate vessel and heated to a temperature of 140°–180° F. In a separate container 200 lbs. of paraffin wax is melted and 15 lbs. of phenothiazine are stirred into the molten wax so as to be colloidally suspended therein. At this stage 400 lbs. of urea and 250 lbs. of salt are dissolved in the hot molasses, after which the paraffin wax-phenothiazine suspension is added thereto with continuous vigorous stirring and the addition of a small quantity (e.g. 40 lbs.) of a suitable emulsifying agent — such as glycero monostearate. During the emulsification, the overall temperature of the molasses and the other components is retained within the above range.

The thus formed homogeneous emulsion is then augmented by the addition thereto of 400 lbs. of one or more suitable cereals such as ground wheat or barley, 200 lbs. of calcium phosphate, 250 lbs. of pollard, and 160 lbs. of calcium carbonate, the composite being continuously and vigorously stirred while these latter fillers, additives and the like are being incorporated. Thereafter the composite, now at approximately 160°–170° F. is transferred, as by pumping, to a large (3 ton capacity) reactor wherein the subsequently described pressure treatment is to be carried out. Before commencing such treatment however, the composite has incorporated therein magnesium oxide (448 lbs.) and optionally — depending upon the viscosity (of composite) required — a variable quantity of coconut meal and/or sunflower seed meal.

At this stage the reactor, which is fitted with a stirring device, is sealed and the composite contained therein is subjected to an absolute pressure of 100 to 400 kilo Pascalls. The composite is subjected to these conditions of temperature and pressure until the compounding thereof is complete which completion is signified by an appreciable thickening of composite. While a period of 4 to 6 hours at the above temperature and pressure will ensure that the reaction is completed, it has been found that even shorter periods (as 2 to 4 hours) are adequate for the purpose.

It has been found that, as the above treatment nears its completion, the "thickening" rate of the composite markedly increases — so that, as the product has to be removed from the reactor, care must be taken that premature solidification is not effected. This situation can be forestalled by the positive addition of further molasses, thereby ensuring that a pourable consistency is maintained; alternatively, if operators are available, premature hardening can be guarded against simply by regularly inspecting the composite, and when it is noticed that the composite, while appreciably thicker, is still pourable, such composite is transferred with the aid of compressed air from the reactor into moulds. Thereafter the product, on cooling, readily solidifies to form a thick preparation which, in addition to possessing the nutritional and antiparasitic qualities mentioned above, is not appreciably hygroscopic and can be kept for an indefinite period under climatic conditions.

EXAMPLE 2

The procedure of Example 1 is followed except that phenothiazine (140 lbs.) is replaced by hexachlorophane (66 lbs.) or any other suitable flukicide. The lick made in accordance with this Example has excellent fluke combatting qualities. It is also highly nutritive and as in the previous Example is not appreciably hygroscopic and can be kept indefinitely.

EXAMPLE 3

The procedure of Example 1 is followed except that phenothiazine is replaced by 150 lbs. of thiobendazol. A lick having similar properties to that described in Example 1 is produced.

EXAMPLE 4

The procedure of Example 1 is followed except that the phenothiazine is augmented by 66 lbs. of hexachlorophane or any other suitable flukicide. In this case a lick is produced which is effective both to eradicate internal and external parasites and combat fluke. It also has the nutritional and climate — resisting properties indicated above.

EXAMPLE 5

In this Example the procedure of Example 1 is again followed with these variations:
(i) phenothiazine (150 lbs.) is replaced by ethoxyquinoline (20 lbs.). In this case the ethoxyquinoline will dissolve in the paraffin wax rather than being merely suspended therein.
(ii) benzalkonium chloride or quaternary ammonia (20 lbs.) and bluestone ($CuSO_4$) (5 lbs.) are incorporated with the heated molasses.
(iii) The urea and di-ammonium phosphate are eliminated.

The lick which is made in accordance with this Example has all the weather resistant and nutritional properties specified above. However, instead of being antiparasitic in its action, its function is to inhibit bloat.

EXAMPLE 6

The procedure of the preceding Example is followed except that benzalkonium chloride (20 lbs.) is the only medicament employed, the ethoxyquinoline being eliminated. A lick having properties substantially similar to those of the preceding Example is produced.

EXAMPLE 7

The procedure of Example 5 is followed except that the benzalkonium chloride is eliminated, ethoxyquinoline (20 lbs.) being the only medicament employed. Once again a lick having properties substantially similar to those of Example 5 is produced.

EXAMPLE 8

The procedure of Example 5 is followed except that the benzalkonium chloride and ethoxyquinoline are augmented by the addition of an equal amount of methyl polysiloxane, which is incorporated in similar fashion to the benzalkonium chloride; a lick having properties similar to those of Example 5 is produced.

EXAMPLE 9

The procedure of Example 5 is followed except that ethoxyquinoline, benzalkonium chloride, methyl polysiloxane, Pluronics, teric ethoxylate and bluestone are incorporated.

The procedure of Example 1 is followed except that the phenothiazine is eliminated. The block so produced is characterised by its palatability to animals and its nutritional qualities, in addition to possessing all the weather resistant properties discussed heretofore.

EXAMPLE 10

The procedure of Example 1 is followed except that 10% by weight of stale bread crumbs from a commercial bakery are added to the mixture before the mixture is transferred to the reactor.

It is found that the reaction mixture solidifies very rapidly to produce a medicated, stable lick.

EXAMPLE 11

The procedure of Example 10 is followed except that phenothiazine is omitted. The fast-setting lick produced provided an unmedicated nutritional source for animals.

As the medicaments can be used individually, or in association, it will be understood that the above Examples could be considerably extended. However, those enumerated should be sufficient to illustrate the multitude of variations which are within the ambit of the invention. It will also be realised that the quantities specified are, of necessity, approximate.

In the above Examples a preferred pressure of 100 to 400 kilo Pascalls had been mentioned. However, it is to be understood that any pressure is suitable for the purpose although, as before stated, pressures in excess of atmospheric are preferred. In like fashion, while a specific temperature range has been stressed, it is to be understood that variations from such temperature range are to be regarded as within the spirit and scope of the invention.

I claim:

1. A process for the production of a lick preparation for animals wherein molasses is compounded with at least one solidifying agent chosen from the group consisting of paraffin wax, hydrogenated animal fat, hydrogenated vegetable oil or a mixture of any of the foregoing, at an elevated temperature not exceeding 180° F and at an absolute pressure of at least 100 kilo Pascalls for a time sufficient to permit thickening thereof without solidifying and then allowing the preparation to cool and solidify.

2. A process as claimed in claim 1 wherein said solidifying agent is paraffin wax.

3. A process as claimed in claim 2 wherein said paraffin wax is refined or semi-refined and has a melting point in the range of 135° to 180° F.

4. A process as claimed in claim 1 wherein said lick preparation also contains at least one additional nutritional substance.

5. A process as claimed in claim 4 wherein said additional nutritional substance is selected from the group consisting of biuret, urea, phosphoric acid, calcium phosphate, pollard, sunflower meal, soya meal, peanut meal, sodium chloride, magnesium oxide, calcium carbonate, trace elements, animal fat, and vegetable oil.

6. A process as claimed in claim 1 wherein said lick preparation also contains one or more medicaments.

7. A process as claimed in claim 6 wherein said medicament is selected from the group consisting of phenothiazine, thiobendazol, O,O-diethyl-O-(3-chloro-4-methyl-7-coumarinyl), phosphorotioate, hexachlorophane, benzalkonium chloride, ethoxyquinoline, methyl polysiloxane, alcohol ethoxylates, antifoaming inhibitors, glycols, and metallic salts.

8. A process as claimed in claim 1 wherein the compounding is carried out in the presence of a catalyst.

9. A process as claimed in claim 8 wherein the catalyst is one or more products of the baking industry and/or guar gum.

10. A process as claimed in claim 8 wherein the catalyst is stale bread or biscuit crumbs.

* * * * *